United States Patent [19]

Altman et al.

[11] Patent Number: 4,565,518

[45] Date of Patent: Jan. 21, 1986

[54] MECHANISM FOR FORMING THREADS IN INJECTION MOLDED PARTS

[75] Inventors: Gary F. Altman, Clarkston, Mich.; Robert K. Beck, Jr., Westlake, Ohio

[73] Assignee: General Motors Corporation, Detroit, Mich.

[21] Appl. No.: 634,592

[22] Filed: Jul. 26, 1984

[51] Int. Cl.[4] ................. B29C 45/26; B29C 45/33
[52] U.S. Cl. ................ 425/568; 264/318; 425/571; 425/582; 425/583
[58] Field of Search ............ 425/568, 571, 574, 582, 425/583, DIG. 58; 264/318, 328.9, 328.11

[56] References Cited

U.S. PATENT DOCUMENTS

| | | | |
|---|---|---|---|
| 1,916,692 | 7/1933 | Scribner | 264/318 |
| 2,408,629 | 10/1946 | Green | 425/547 |
| 3,018,519 | 1/1962 | Morin et al. | 264/328.11 |
| 3,247,548 | 4/1966 | Fields et al. | 264/318 |
| 3,584,092 | 6/1971 | Alexandris | 264/318 |

*Primary Examiner*—Jay H. Woo
*Assistant Examiner*—Timothy W. Heitbrink
*Attorney, Agent, or Firm*—Herbert Furman

[57] ABSTRACT

A mechanism for forming threads in injection molded parts includes a core member having a threaded end which is moved into and out of a mold cavity. The core member is slidably and rotatably mounted on a support and is driven by a motor through a first lost motion rotatable connection. The core member is moved linearly upon rotation thereof into the mold cavity by a lead screw member which is coupled to the core member through a second lost motion connection and threadably mounted in the support.

5 Claims, 6 Drawing Figures

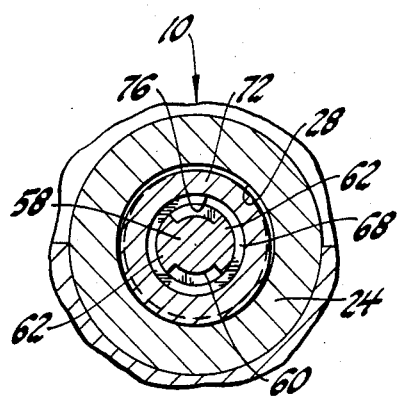
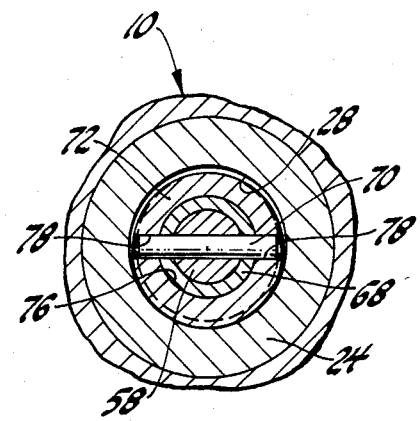
Fig. 4  Fig. 5
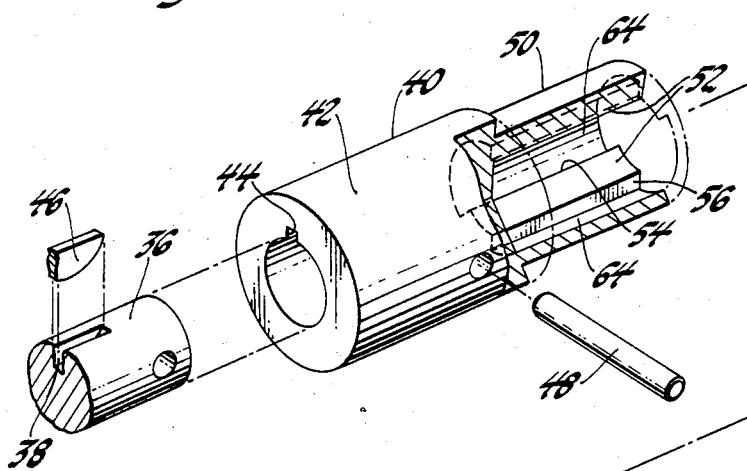
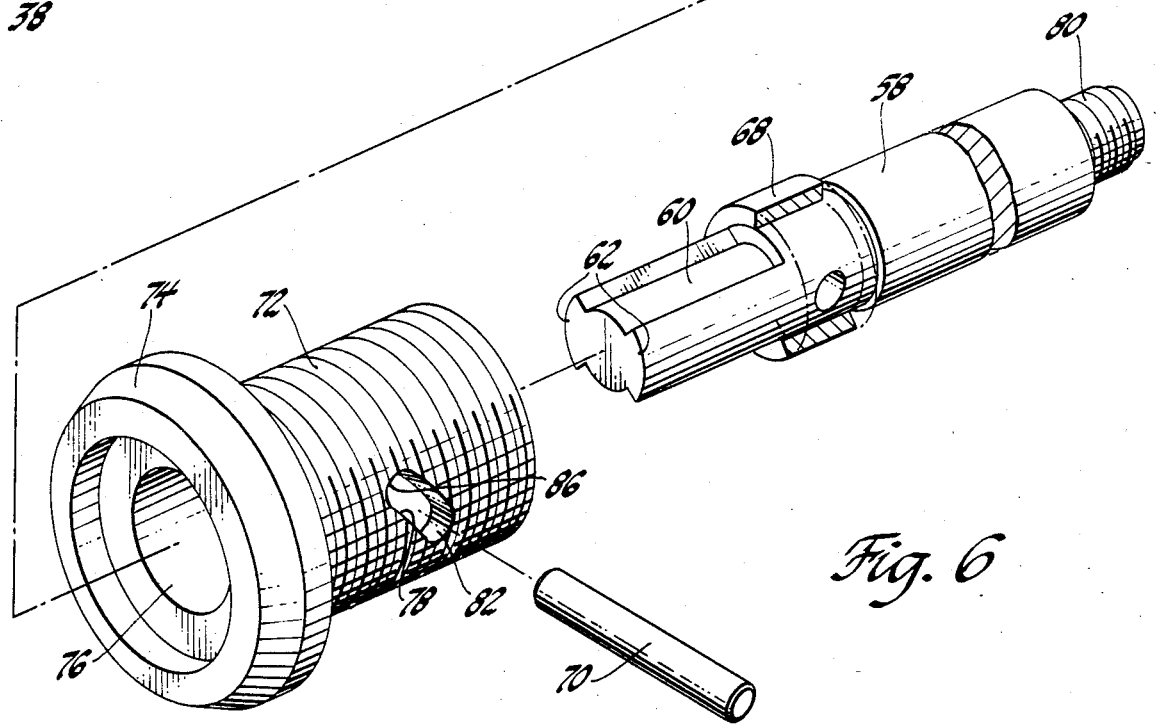
Fig. 6

MECHANISM FOR FORMING THREADS IN INJECTION MOLDED PARTS

This invention relates generally to a mechanism for forming threads in injection molded parts and more particularly to such a mechanism which includes a threaded unitary core member for forming like unitary threads in a part which is molded about the core member in a die cavity.

It is known to form threads in injection molded parts, either by the use of die inserts in the mold halves or by a split type expandable core member. Both of these have the disadvantage of not being able to provide fine threads and often flash results which must be removed in a secondary operation after the molding process. It is also known to form threads in injection molded parts in a trapping operation after removal of the part from the mold.

The mechanism of this invention forms either internal or female threads or external or male threads in a part during the injection molding process. The mechanism includes a core member having a threaded end which is movable between an extended position in the die cavity or a retracted position out of the die cavity. The core member is moved into the die cavity prior to molding of a part about the core member in the die cavity. After the part has been formed in the die cavity, the core member is moved out of the die cavity as the threaded end thereof threads out of engagement with the molded part.

In the preferred embodiment of the invention, the core member is slidably and rotatably mounted on a support and slidably and rotatably coupled by a key and keyway connection to a motor. The key and keyway connection provides a lost motion connection. A lead screw member is threadedly mounted on the support for translation relative thereto upon rotation of the lead screw member. The lead screw member is rotatably coupled to the core member by a pin and slot connection which provides a second lost motion connection of greater lost motion extent than the first lost motion connection. When the core member is in a retracted position out of the die cavity, the motor can be initially started up and can overcome its stall torque before the motor is connected to the core member by a key and keyway connection due to the first lost motion connection. Thereafter upon the initiation of rotation of the core member and motor as a unit, the lead screw is rotatably coupled to the core member by the pin and slot connection. The rotation of the lead screw member moves the core member therewith as a unit so that the core member is moved into the die cavity as it slides relative to the motor while remaining rotatively coupled thereto. A stop engaged by the lead screw member stalls the motor and locates the core member in its extended position in the die cavity.

After the part has been molded about the core member, the motor is rotated in the opposite direction. The first lost motion connection permits the motor to overcome the stall torque and to start up before there is any connection of the motor to the core member. The dynamic force occurring when the key and keyway connection between the motor and the core member is again engaged, aids in breaking loose the core member from the molded part. As the core member begins to thread out of the molded part, the second lost motion connection couples the lead screw member to the core member so that the lead screw member rotates with the core member as the core member is withdrawn from the molded part.

The mechanism of this invention ensures that no secondary operations are necessary after the part is removed from the mold since there is no possibility of any flash or distortion occurring during molding of the part. Additionally, it permits fine threads to be formed in the molded part. One mechanism is provided for each die cavity.

The primary feature of this invention is that it provides an improved mechanism for forming male or female unitary threads in an injection molded part, with the mechanism including a unitary core member about which the part is molded in a die cavity and which is movable relative to the die cavity prior to and after the molding process.

This and other features will be readily apparent from the following specification and drawings wherein:

FIG. 4 is a sectional view taken along line 4—4 of FIG. 1.

FIG. 5 is a sectional view taken along line 5—5 of FIG. 1, and

FIG. 6 is an exploded view of the mechanism.

Figure 1:
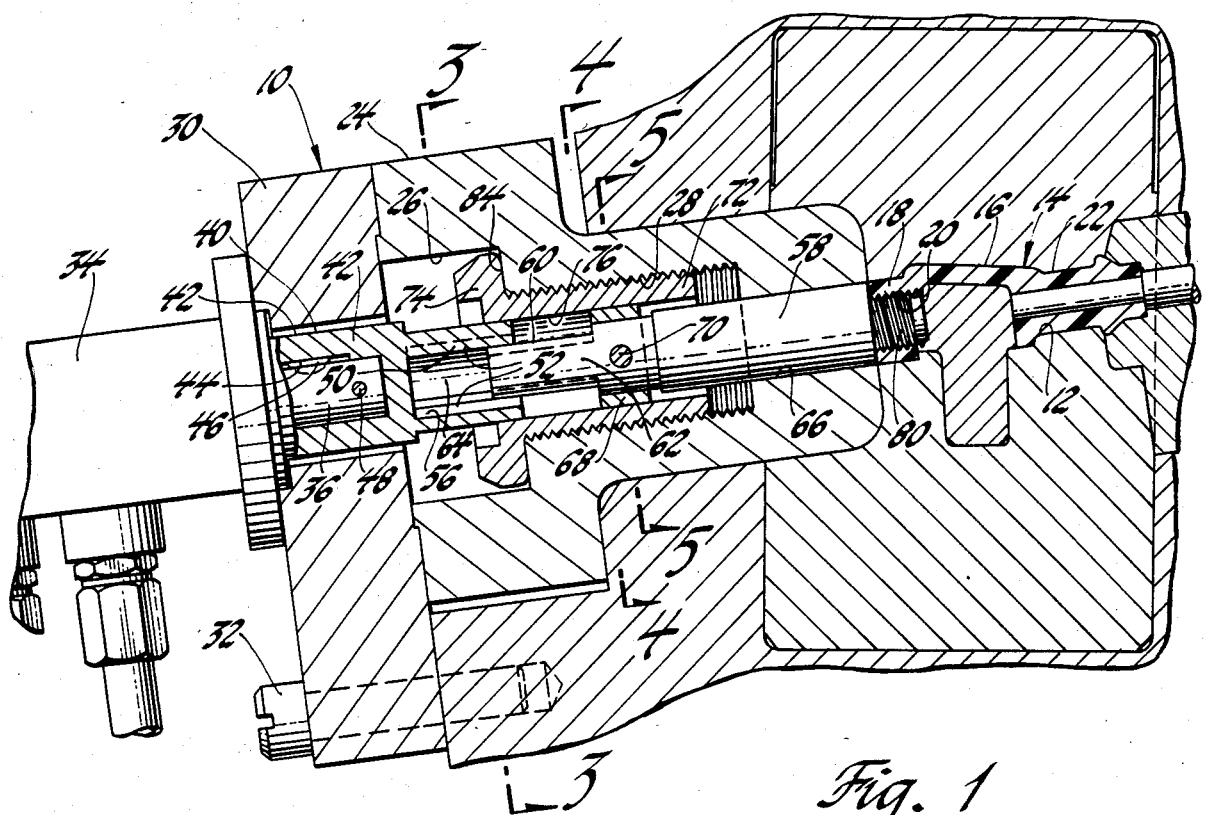
FIG. 1 is a partial view of an injection molding machine having a mechanism according to this invention mounted thereon for forming a female thread in a part molded in a die cavity of the machine, with the mechanism being shown with the core member in an extended position within the die cavity and the part molded around the core member.
Figure 2:
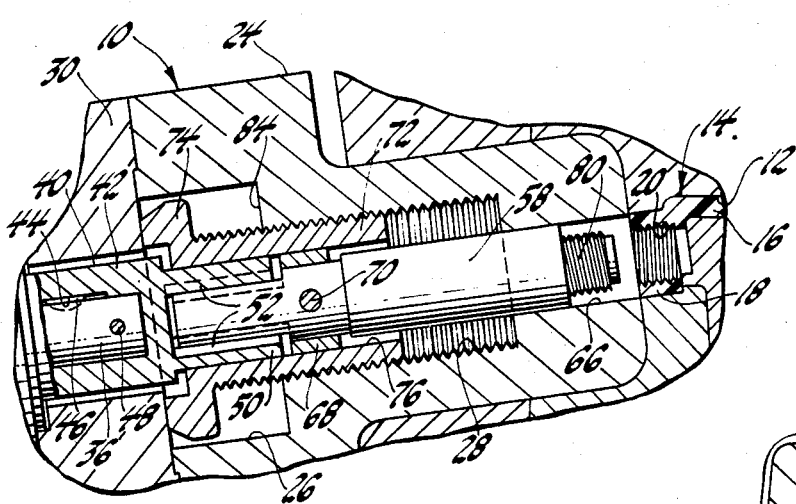
FIG. 2 is a view of a portion of FIG. 1 showing the core member retracted from the molded part.

Referring now to FIGS. 1 and 2 of the the drawings, a conventional injection molding machine 10 includes a mold having a die cavity 12 for forming a plastic part 14 by injection molding. The part 14 includes a central circular cap portion 16, a circular extension 18 having an internally or female threaded bore 20, and another circular extension 22. The part and the machine form no part of this invention since the mechanism of this invention can be used with various commercially available machines to form various plastic molded parts having either female or male threaded portions thereof.

The machine further includes a bell type housing portion 24 having a circular bore 26 and a smaller diameter threaded circular bore 28 opening to bore 26. A mounting block 30 is bolted at 32 to the housing portion 24 and covers the opening of the bores 26 and 28.

A hydraulically driven conventional motor 34 is secured to the block 30 and includes a rotatable output shaft 36 having a keyway 38, FIG. 6. An adapter 40 includes a first cylindrical end portion 42 having a keyway 44. Key 46 is received within the keyways 38 and 44 to rotatably couple the adapter 40 and the motor 34 for rotation as a unit. A pin 48 extending through aligned apertures in the end portion 42 and in the shaft 36 further couples the adapter 40 and the motor 34. The other cylindrical end portion 50 of the adapter 40 includes a pair of opposed keys 52 having shoulders 54 and 56, FIGS. 3 and 6. A core member 58 includes an extension 60 having a pair of keys 62 which are received in the keyways 64 between the keys 52 of the end portion 50 of adapter 40. The keys 62 are of lesser circumferential extent than keyways 64 and a lost motion connection is thereby provided between adapter 40 and core member 58. The core member is slidably and rotatably mounted within a bore 66 of the housing portion 24. A reduced diameter portion of the core member receives a bushing 68 pinned thereto at 70.

A lead screw member 72 has a threaded exterior body and is threaded into the bore 28 of the housing portion 24. The lead screw member further includes a head portion 74 which is received within the bore 26. The axial bore 76 of the lead screw member rotatably receives the end portion 50 of the adapter 40 and the bushing 68. The ends of the pin 70 project upwardly of the bushing and are slidably received within angular or closed helical slots 78 in the body of the lead screw member 72. The angle of slot 78 is greater than the angle of the threads on the body of the lead screw member 72 to permit the ends of the pin 70 to move within the slots without imparting any rotational movement to the lead screw member due to such movement. The core member 58 has a male threaded end 80, the threads of which have the same pitch as the threads on the body of the lead screw member 72. It will be understood that the core member 58 could likewise have a female threaded end if male threads were to be formed in the part 14.

Figure 3:
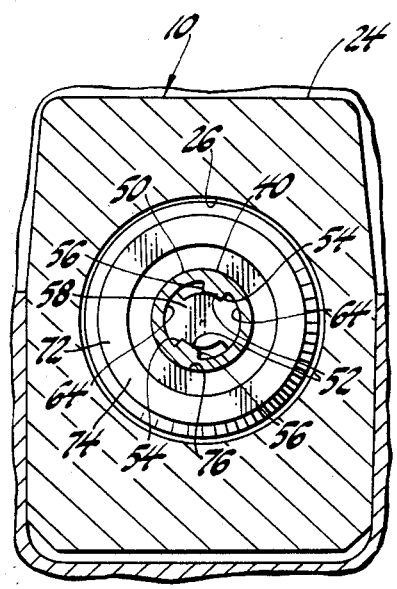
FIG. 3 is a sectional view taken along line 3—3 of FIG. 1.

As shown in FIG. 1, the threaded end 80 of the core member 58 is located within the die cavity 12 to form threads on the extension 18 of the part 14 when molten plastic is subsequently injected into the die cavity and solidifies. As shown in FIGS. 3 through 5, the shoulders 54 of keys 52 of the adapter 40, engage key 62 of the core member 58 when the core member is in its extended position shown in FIG. 1. Shoulders 56 of the keys 52 are spaced from keys 62. The ends of pin 70 are at the closed ends 82 of slots 78 and the head portion 74 of the lead screw member 72 engages the wall 84 of bore 26 under the braking force of the stall torque of motor 34. Thus the core member 58 is locked in place in its extended position and wall part 14 is molded about the threaded end 80 of the core member.

FIG. 1 shows the core member in its extended position and FIG. 2 shows the core member in its retracted position. After the part has been molded, the mold opens and the motor 34 is then operated to rotate the shaft counterclockwise, as viewed in FIGS. 3, 4, 5 and 6, to move the core member from its FIG. 1 extended position to its FIG. 2 retracted position. Upon initial rotation of the shaft 36 in the counterclockwise direction, the shoulders 54 disengage from keys 62 and the shoulders 56 move into engagement with keys 62 as the keys 52 rotate relative to the key 62 without any movement of the core member. The pins 70 disengage from the ends 82 of the slots 78 and move relative to the slots, without any movement of the lead screw member, toward engagement with the ends 86 of the slots. The lost motion connection between adapter 40 and core member 58 provided by keyways 64 and keys 62 and the lost motion connection between core member 58 and lead screw member 72 provided by pins 70 and slots 78 permit the motor 34 to initially start up and overcome the stall torque before there is any connection of shaft 36 to the core member and any threading of the core member out of the molded plastic part 14. Upon continued rotation of the shaft 36, the shoulders 56 of keys 52 engage keys 62 to rotate the core member 58 counterclockwise and start to thread the end 80 of the core member out of the part 14. The dynamic force occurring when the shoulders 56 engage keys 62 aids in breaking loose the end 80 of the core member from the part 14. After initial unthreading of the core member 58 from the part 14, the ends of the pins 70 engage the ends 86 of the slots 78 and initiate rotation of the lead screw member 72 concurrently with rotation of the core member 58 to move both to their position shown in FIG. 2 as the lead screw member threads out of the bore 28. This retracts the threaded end 80 of the core member 58 completely out of the molded plastic part 14. The engagement of the head portion 74 of the lead screw member 72 with block 30 stalls motor 34.

When it is thereafter desired to move the core member 58 from its FIG. 2 retracted position to its FIG. 1 extended position within the die cavity 12, the motor 34 is operated to rotate the shaft 36 clockwise as viewed in FIGS. 3, 4 and 5. The shoulders 56 of keys 52 disengage from keys 62 and the shoulders 54 of the keys 52 engage the keys 62 to initiate clockwise rotation of the adapter 40 and the core member 58 as a unit. The lost motion connection between the keys 52 and the keys 62 permits the motor to start up and overcome the stall torque before any connection of the motor to the core member. After initiation of rotational movement of the core member 58 with the motor 34, the ends of the pin 70 engage the ends 82 of the slots 78 to initiate linear and rotational movement of the core member 58 and the lead screw member 72 as a unit as the lead screw member threads into the bore 28. The extension 60 of the core member 58 moves axially out of the adapter 40 as the core member 58 moves axially or linearly with the lead screw member 72 to its FIG. 1 extended position wherein the threaded end 80 thereof is located within the die cavity 12 preparatory to injection of molten plastic within the die cavity and molding of the part 14. The engagement of the head portion 74 of the lead screw member with wall 84 of bore 26 locates the core member in its extended position and locks the core member in this position before the molding of the part 14. As the extension 60 of the core member 58 moves axially relative to the adapter 40, the shoulders 54 of the keys 52 remain in engagement with the keys 62 but move relative thereto to maintain the rotative coupling of the motor 34 and the core member 58 while permitting rotative sliding movement therebetween.

It can be seen from the foregoing description that the mechanism of this invention can form either male or female unitary threads in a molded plastic part during the molding process. The pitch of the threads can be coarse or fine as desired. The provision of the lost motion connections between the motor and the core member and between the core member and the lead screw member permits the motor to overcome the stall torque when the core member is either in its extended or retracted position before there is any connection of the motor to the core member and also permits the motor to apply dynamic force to the core member to aid in breaking the core member loose from the molded plastic part. The lead screw member is necessary in order to move the core member from its retracted to its extended position. The core member itself moves the lead screw member with it to the retracted position of the core member as the core member threads out of the molded plastic part.

Thus this invention provides an improved mechanism for forming theads in injection molded parts.

The embodiments of the invention in which an exclusive property or privilege is claimed are defined as follows:

1. A mechanism for forming a thread in a molded part, comprising, in combination, a support, a die cavity for forming the molded part and a threaded bore adjacent the die cavity, a threaded member rotatably mounted in the threaded bore for extension and retraction relative to the die cavity upon rotation thereof in the bore, a threaded core member, a rotatable operator mounted to the support, cooperating key and keyway coupling means slidably and rotatably coupling the operator to the threaded core member for rotating the threaded core member in opposite rotative directions upon operation of the operator, second coupling means coupling the threaded core member to the threaded member for linear movement therewith and extension into the die cavity upon rotation of the threaded core member by the operator in one rotative direction and retraction out of the die cavity upon rotation of the threaded core member by the operator in the other rotative direction, and lost motion means in the key and keyway coupling means permitting initial startup of the operator in the one rotative direction independent of coupling of the operator to the threaded core member.

2. A mechanism for forming a thread in a molded part, comprising, in combination, a support, a die cavity for forming the molded part and a threaded bore adjacent the die cavity, a threaded member rotatably mounted in the threaded bore for extension and retraction relative to the die cavity upon rotation thereof in the bore, a threaded core member, a rotatable operator mounted to the support, cooperating key and keyway first coupling means slidably and rotatably coupling the operator to the threaded core member for rotating the threaded core member in opposite rotative directions upon operation of the operator, second coupling means coupling the threader core member to the threaded member for linear movement therewith and extension into the die cavity upon rotation of the threader core member by the operator in one rotative direction and retraction out of the die cavity upon rotation of the threaded core member by the operator in the other rotative direction, lost motion means in the key and keyway first coupling means permitting initial startup of the operator in the one rotative direction independent of coupling of the operator to the threaded core member, and lost motion means in the second coupling means permitting startup of the operator and threaded core member prior to coupling of the thread core member to the threaded member to aid in loosening the threaded core member from the molded part.

3. A mechanism for forming a thread in a portion of a molded part, comprising, in combination, a support, a die cavity for forming the molded part, a threaded core member, a rotatable operator mounted on the support, coupling means slidably and rotatably coupling the threaded core member to the operator, the threaded core member rotating in place without linear translatory movement upon rotation of the operator in one and opposite rotative directions, core member moving means, means threadedly mounting the core member moving means on the support for linear translatory movement of the core member moving means relative to the support and toward the die cavity upon rotation of the core member moving means in one rotative direction and linear translatory movement of the core member moving means relative to the support and away from the die cavity upon rotation of the core member moving means in an opposite rotative direction, and means coupling the threaded core member to the core member moving means for rotating the core member moving means conjointly with the threaded core member upon rotation of the threaded core member by the operator, rotation of the threaded core member in the one rotative direction by the operator rotating the core member moving means in the said one rotative direction to thread the core member moving means relative to the support and linearly translate the core member moving means toward the die cavity and conjointly move the threaded core member into the die cavity, rotation of the threaded core member in the opposite rotative direction by the operator rotating the core member moving means in the said opposite rotative direction to thread the core member moving means relative to the support and linearly translate the core member moving means away from the die cavity and conjointly. threadedly disengage the threaded core member from the threaded portion of the molded part, the molded part remaining in the die cavity as the threaded core member threadedly disengages from the threaded portion thereof.

4. A mechanism for forming a thread in a portion of a molded part, comprising, in combination, a support, a die cavity for forming the molded part, a threaded core member, a rotatable operator mounted on the support, coupling means slidably and rotatably coupling the threaded core member to the operator, the threaded core member rotating in place without linear translatory movement upon rotation of the operator in one and opposite rotative directions, core member moving means, means threadedly mounting the core member moving means on the support for linear translatory movement of the core member moving means relative to the support and toward the die cavity upon rotation of the core threader moving means in one rotative direction and linear translatory movement of the core member moving means relative to the support and away from the die cavity upon rotation of the core member moving means in an opposite rotative direction, and second means coupling the threaded core member to the moving means for rotating the core member moving means conjointly with the threaded core member upon rotation of the thread core member by the operator, rotation of the threaded core member in the one rotative direction by the operator rotating the core member moving means in the said one rotative direction to thread the core member moving means relative to the support and linearly translate the core member moving means toward the die cavity and conjointly move the threaded member into the die cavity, rotation of the threaded core member in the opposite rotative direction by the operator rotating the core member moving means in the said opposite rotative direction to thread the moving means relative to the support and linearly translate the core member moving means away from the die cavity and conjointly threadedly disengage the threaded core member from the threaded portion of the molded part, the molded part remaining in the die cavity as the threaded core member threadedly disengages from the threaded portion thereof, said second coupling means including lost motion means permitting limited rotation of the operator independent of the threaded core member upon initial startup of the operator to rotate the threaded core member in the opposite rotative direction to aid in rotatably disengaging the threaded core member from the threaded portion of the molded part.

5. A mechanism for forming a thread in a portion of a molded part, comprising, in combination, a support, a die cavity for forming the molded part, a threaded core member, a rotatable operator mounted on the support, first coupling means slidably and rotatably coupling the core member to the operator, the threaded core member rotating in place without linear translatory movement upon rotation of the operator in one and opposite rotative directions, core member moving means, means threadedly mounting the core member moving means on the support for linear translatory movement of the core member moving means relative to the support and toward the die cavity upon rotation of the core member moving means in one rotative direction and linear translatory movement of the core member moving means relative to the support and away from the die cavity upon rotation of the core member moving means in an opposite rotative direction, and second coupling means coupling the threaded core member to the moving means for rotating the core member moving means conjointly with the threaded core member upon rotation of the threaded core member by the operator, rotation of the threaded core member in the one rotative direction by the operator rotating the core member moving means in the said one rotative direction to thread the core member moving means relative to the support and linearly translate the core member moving means toward the die cavity and conjointly move the threaded core member into the die cavity, rotation of the threaded core member in the opposite rotative direction by the operator rotating the core member moving means in the said opposite rotative direction to thread the core member moving means relative to the support and linearly translate the core member moving means away from the die cavity and conjointly threadedly disengage the threaded core member from the threaded portion of the molded part, the molded part remaining in the die cavity as the threaded core member threadedly disengages from the threaded portion thereof, and first and second lost motion means in the first and second coupling means permitting limited initial startup of the operator independent of coupling of the operator to the threaded core member and (1) movement of the threaded core member into the die cavity and (2) disengagement of the threaded core member from the threaded portion of the molded part.

* * * * *

UNITED STATES PATENT AND TRADEMARK OFFICE
CERTIFICATE OF CORRECTION

PATENT NO. : 4,565,518

DATED : January 21, 1986

INVENTOR(S) : Gary F. Altman; Robert K. Beck Jr.

It is certified that error appears in the above-identified patent and that said Letters Patent is hereby corrected as shown below:

```
Column 6, line 52, delete "threader" and insert -- member --.
          line 61, delete "thread" and insert -- threaded --.

Column 7, line  6, after "the" insert -- core member -- .
          line 29, after "the" (first occurrence) insert
                     -- threaded -- .

Column 8, line  6, after "the" (first occurrence) insert
                     -- core member --.
```

Signed and Sealed this

Eighth Day of July 1986

[SEAL]

Attest:

DONALD J. QUIGG

Attesting Officer

Commissioner of Patents and Trademarks